United States Patent
Ishida et al.

(10) Patent No.: US 7,308,095 B2
(45) Date of Patent: Dec. 11, 2007

(54) HOLDER AND COMMUNICATION APPARATUS

(75) Inventors: Kazuhito Ishida, Ichinomiya (JP); Takamitsu Kawai, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 327 days.

(21) Appl. No.: 11/181,904

(22) Filed: Jul. 15, 2005

(65) Prior Publication Data

US 2006/0013386 A1    Jan. 19, 2006

(30) Foreign Application Priority Data

Jul. 16, 2004    (JP)    ............................. 2004-210823

(51) Int. Cl.
*H04M 1/00*    (2006.01)
(52) U.S. Cl. ...................................... 379/449; 379/455
(58) Field of Classification Search ........... 379/100.01, 379/441, 447, 448, 449, 454, 455; 455/90.3, 455/569.1

See application file for complete search history.

(56) References Cited

U.S. PATENT DOCUMENTS

| | | | | |
|---|---|---|---|---|
| 5,181,242 A | * | 1/1993 | Stack | 379/445 |
| 5,737,097 A | * | 4/1998 | Fujimoto | 358/476 |
| 5,865,503 A | * | 2/1999 | Shields, Jr. | 297/188.14 |

FOREIGN PATENT DOCUMENTS

| | | |
|---|---|---|
| JP | 2-143872 | 12/1990 |
| JP | 5-651-59 | 8/1993 |
| JP | 7297963 | 11/1995 |
| JP | 11136403 | 5/1999 |

* cited by examiner

*Primary Examiner*—Curtis Kuntz
*Assistant Examiner*—Tuan Duc Nguyen
(74) *Attorney, Agent, or Firm*—Banner & Witcoff, Ltd

(57) ABSTRACT

A holder that is detachably attachable to a casing of a communication apparatus, including: a placement surface on which a handset can be placed; a first side surface; a displacement unit that is displaced in response to an act of placing the handset on the placement surface; a lever that is displaced according to a displacement of the displacement unit, the lever being projected in a first direction by a first distance from the first side surface; and an engagement portion being projected substantially in the first direction by a second distance, which is longer than the first distance, from the first side surface, the engagement portion engaging the holder with the casing.

23 Claims, 8 Drawing Sheets

HOLDER AND COMMUNICATION APPARATUS

BACKGROUND OF THE INVENTION

1. Field of the Invention

The present invention relates to a holder on which a handset can be placed and which can be attached to and detached from a main body of a communication apparatus, and relates to the communication apparatus.

2. Description of the Related Art

Conventionally, communication apparatus such as facsimile machines have been developed that are configured so as to enable a holder capable of holding a handset thereon to be attached to and detached from their apparatus main body. For example, in a facsimile machine disclosed in Japanese Patent No. 3,039,602, one side wall of a housing is formed with an opening having a prescribed opening area and a holder on which a handset is placed is attached to the opening in a detachable manner. The detachable holder is a resin molded part that is a combination of a top cover and a bottom cover, and a plunger and a lever piece are accommodated in its inside hollow space. The top cover is formed with a tongue piece extending in the horizontal direction from its side portion, and the bottom cover is formed with a skirt piece extending obliquely downward in a curved manner. The plunger is a member that is responsive to an act of picking up or putting down a handset. A head portion of the plunger can project and retract through a hole of a handset placement wall. A compression spring is set elastically between an inner bottom portion of the holder and the plunger, whereby the plunger is normally urged upward. Therefore, when the handset is picked up from the holder, the head portion of the plunger projects through the hole. On the other hand, when the handset is placed on the holder, the head portion of the plunger is pushed down by the handset and hence is retracted under the hole. Since the plunger and the lever piece are integral with each other, the lever piece operates according to an operation of the plunger.

To attach the holder to the housing, the skirt piece is inserted into and engaged with a bottom edge portion of the opening and then the tongue piece is elastically engaged with a top edge portion of the opening. In this manner, the holder can be attached to the opening easily.

At this time, since the lever piece extends from the holder outward to a large extent, the lever piece goes into the inside of the housing through the opening when the holder is attached to the opening. Further, a control board is erected in the vicinity of the opening. Since the head portion of the plunger projects or retracts through the hole in response to an act of picking up the handset from the holder or putting it down on the holder, the free end of the lever piece forms a vertical-arc-shaped locus in front of the control board. A microswitch as a sensor is disposed on the control board at a position in a top region of the arc-shaped locus to be formed by the free end of the lever piece. Therefore, whereas the free end of the lever piece is not in contact with the microswitch when the handset is placed on the holder, the lever piece is rotated upward and its free end comes into contact with the microswitch when the handset is picked up. Therefore, the facsimile machine detects that the handset has been picked up when the free end of the lever piece has contacted the microswitch, and causes switching from a facsimile operation mode to a telephone operation mode.

SUMMARY OF THE INVENTION

Recently, downsizing of the communication apparatus is desired. In view of this, it has been conceived to make the holder detachable from the apparatus main body so that users can easily conduct the detachment and attachment operation of the holder in answer to the users' tastes.

In the facsimile machine disclosed in Japanese Patent No. 3,039,602, the attachment operation of the holder is cumbersome because the lever piece that extends from the holder into the housing is needed to be treated carefully.

Also, since the lever piece extends from the holder outward to a large extent, it is highly probable that the lever piece touches the surface of a desk or the like if the holder is removed from the housing and placed on the desk or the like. This results in a problem that the lever piece may be damaged if a strong external force or the like is erroneously caused to act on the holder.

Further, in the facsimile machine disclosed in Japanese Patent No. 3,039,602, the holder is disposed on the top surface of the housing and the tongue piece is elastically engaged with the top edge portion of the opening. Therefore, a user can easily touch the tongue piece. This results in a problem that if the holder is not fixed to the housing with a screw or the like, the holder may come off the housing when the user touches the tongue piece erroneously.

The present invention provides a holder which can be detachably attached to a main body of a communication apparatus easily but securely and which is less likely to be damaged even when left detached from the main body. The present invention also provides a communication apparatus having such a holder.

According to one aspect of the invention, there is provided a holder that is detachably attachable to a casing of a communication apparatus, including: a placement surf ace on which a handset can be placed; a first side surface; a displacement unit that is displaced in response to an act of placing the handset on the placement surface; a lever that is displaced according to a displacement of the displacement unit, the lever being projected in a first direction by a first distance from the first side surface; and an engagement portion being projected substantially in the first direction by a second distance, which is longer than the first distance, from the first side surface, the engagement portion engaging the holder with the casing.

According to another aspect of the invention, there is provided a communication apparatus including: a casing; a handset; a holder that is detachably attachable to the casing and includes: a placement surface on which the handset can be placed; a first side surface; a displacement unit that is displaced in response to an act of placing the handset on the placement surface; a lever that is displaced according to a displacement of the displacement unit, the lever being projected in a first direction by a first distance from the first side surface; and an engagement portion being projected substantially in the first direction by a second distance, which is longer than the first distance, from the first side surface, the engagement portion engaging the holder with the casing; and a detection unit that detects in cooperation with the lever whether or not the handset is placed on the placement surface.

According to the above-described structure, the second distance by which the engagement portion projects from the first side surface is longer than the first distance by which the lever projects from the first side surface. When the user positions the holder to engage the engagement portion with the casing of the communication apparatus, the lever of the holder is properly positioned so as to correspond to the detection unit disposed on the side of the communication apparatus. Therefore, the attachment operation of the holder with respect to the casing of the communication apparatus is facilitated.

Also, since the second distance by which the engagement portion projects from the first side surface is longer than the first distance by which the lever projects from the first side surface, even if the holder is left detached from the casing, the probability that the holder is damaged is very low.

BRIEF DESCRIPTION OF THE DRAWINGS

The present invention may be more readily described with reference to the accompanying drawings.

DETAILED DESCRIPTION OF THE PREFERRED EMBODIMENTS

An embodiment of the present invention will be hereinafter described with reference to FIGS. 1-8.

Figure 1:
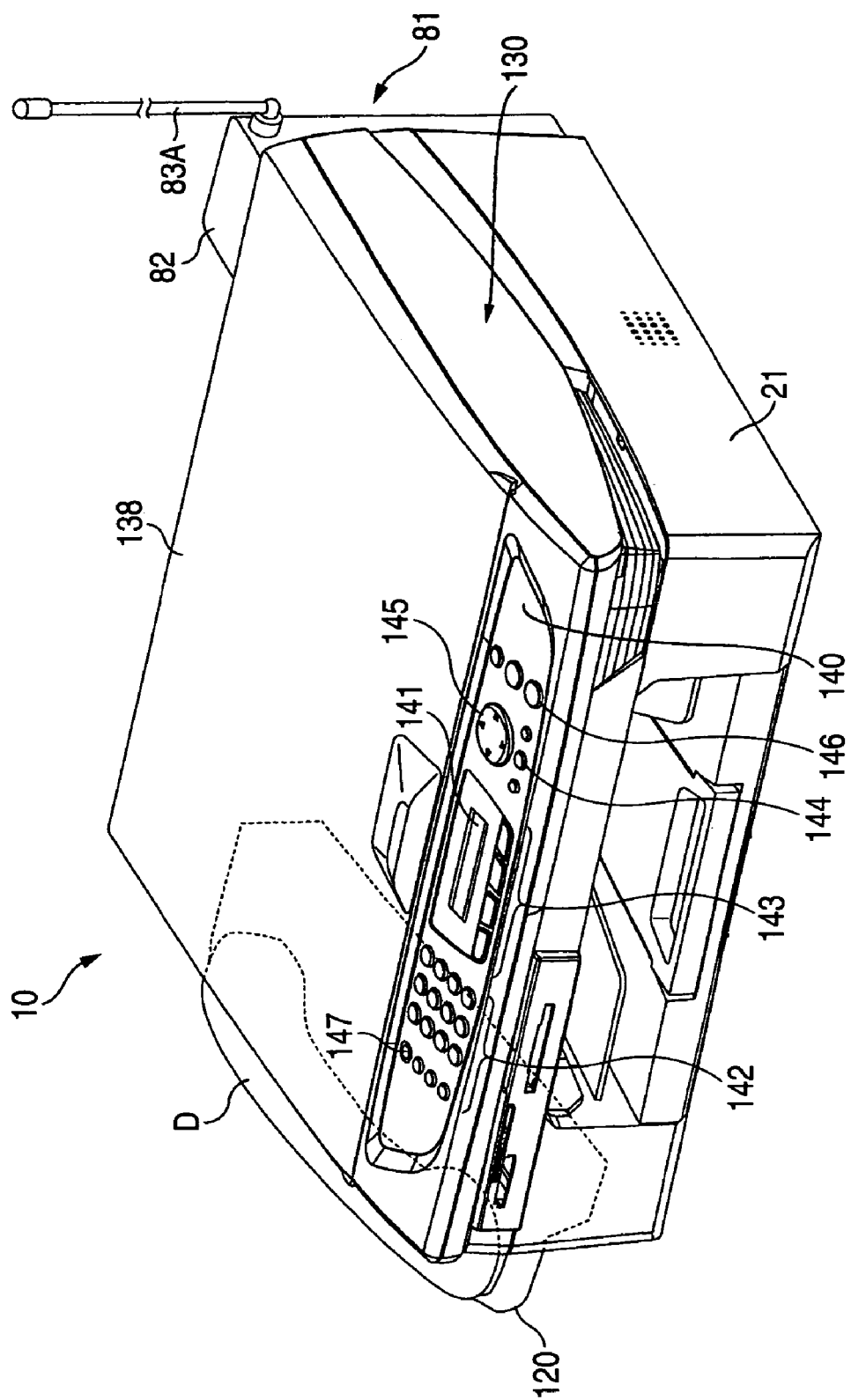
FIG. 1 is a perspective view showing an appearance of a multifunction machine according to an embodiment.

FIG. 1 is a perspective view of a multifunction machine (which functions as a communication apparatus) 10 according to the embodiment. The multifunction machine 10 has a telephone function, a facsimile function, and a copier function as well as a scanner function and a printer function that are performed when the machine is connected to a personal computer or the like.

Figure 2:
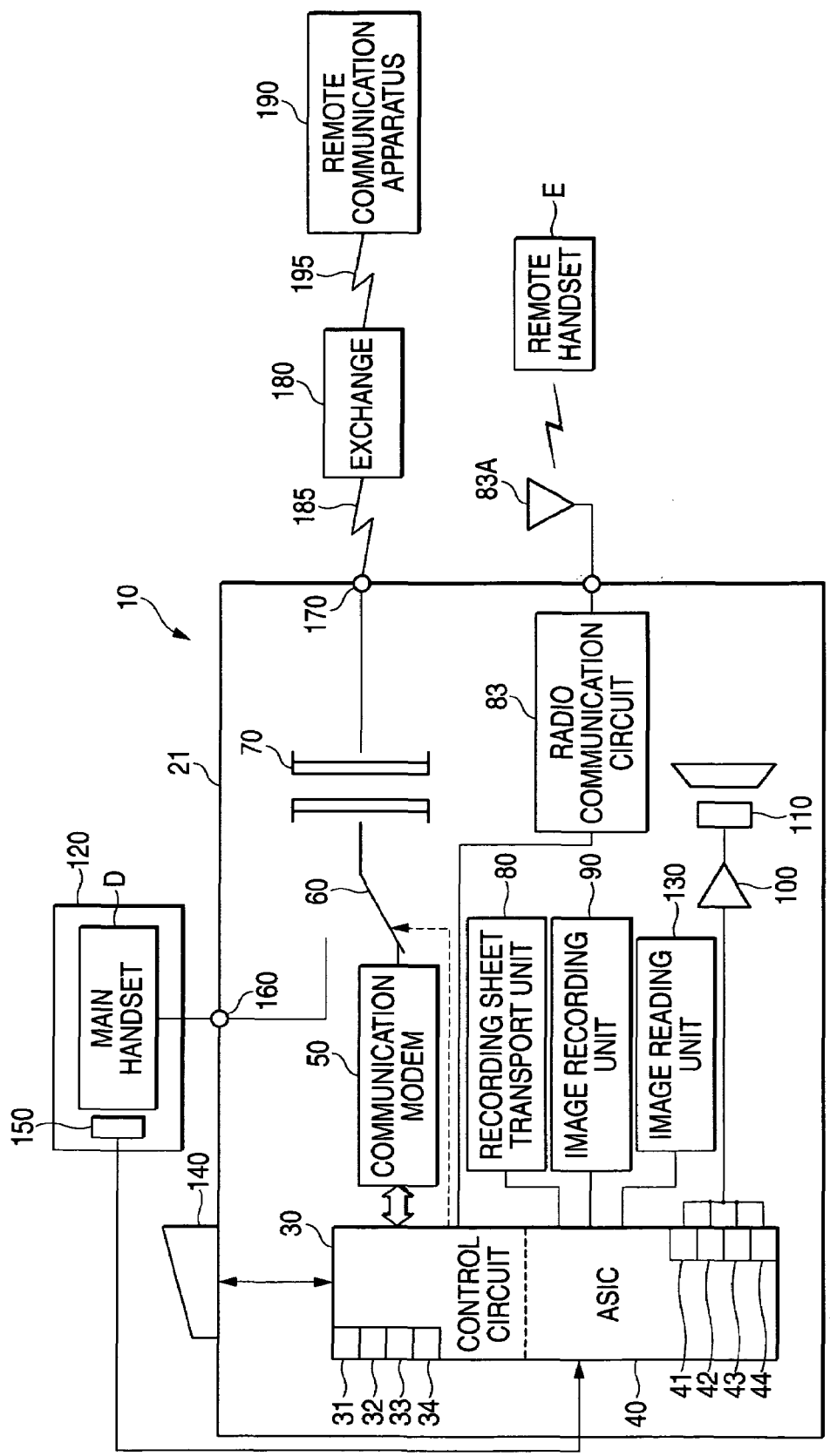
FIG. 2 is a block diagram showing the internal configuration of the multifunction machine according to the embodiment.

The multifunction machine 10 is configured in such a manner that a flatbed scanner (hereinafter referred to as "image reading unit") 130 is disposed on top of a machine casing 21 that houses a printer including a recording sheet transport unit 80 and an image recording unit 90 (see FIG. 2). An operating panel 140 that is equipped with various manipulation keys and a display unit (hereinafter referred to as "LCD" (liquid crystal display) 141 is disposed on the front side of the image reading unit 130. The various keys include ten digit keys 142 that enable input of a number or alphabetical characters, function keys 143 for selecting among the various functions, a menu/setting key 144 for causing display of a menu on the LCD 141 or deciding on any of various settings, a cruciform key 145 for changing the content of display of the LCD 141 in order, a stop key 146 for stopping an operation of the multifunction machine 10 halfway, and a power key 147 for applying power to the multifunction machine 10. A user can, for example, input a telephone number or set any of various modes of the multifunction machine 10 by manipulating a proper key(s) on the operating panel 140. The image reading unit 130 is equipped with an openable document cover 138. The user can perform a facsimile communication, copying, or the like by placing a document on a platen glass (not shown) in a state where the document cover 138 is opened and then manipulating proper keys on the operating panel 140. The image reading unit 130 is connected to the machine casing 21 via a hinge (not shown) that is attached to a top portion of one side of the machine casing 21. Therefore, the image reading unit 130 can be opened upward from the machine casing 21 by rotating it about the hinge (what is called a clamshell type).

A holder 120 on which a handset (hereinafter referred to as "main handset") D can be placed is attached to one side wall of the machine casing 21 in a detachable manner. A telephone conversation is possible via the main handset D.

As shown in FIG. 1, a communication unit 81 is attached to the rear sidewall of the machine casing 21. The communication unit 81 has a synthetic resin casing 82, and a communication board (hereinafter referred to as "radio communication circuit") 83 (see FIG. 2) is accommodated in the casing 82. The radio communication circuit 83 is for a wireless connection to another handset (hereinafter referred to as "remote handset") E (see FIG. 2). The communication unit further has an antenna 83A for transmission and reception. In this manner, the multifunction machine 10 is equipped with the main handset D that is directly connected to the machine casing 21 and a cordless remote handset E. One of the main handset D and remote handset E can be used selectively depending on a use. A telephone conversation is also possible between the two handsets.

Next, the internal configuration of the multifunction machine 10 according to the embodiment will be described briefly with reference to FIG. 2.

The machine casing 21 of the multifunction machine 10 according to the embodiment is equipped with a connector 160 to which the main handset D is connected electrically and a connector 170 to which a telephone line 185 is connected. The telephone line 185 is a line for connecting a remote exchange 180 and the multifunction machine 10. The remote exchange 180 is connected to a remote communication apparatus 190 via a telephone line 195. The holder 120 capable of holding the main handset D is attached to the machine casing 21 in a detachable manner.

A control circuit 30, a communication modem 50, a relay 60, a line transformer 70, a recording sheet transport unit 80, the image recording unit 90, an amplifier 100, and a speaker 110 are provided inside the machine casing 21. As described above, the image reading unit 130 is mounted on top of the machine casing 21 in an openable manner.

The control circuit 30 is a microcomputer whose main components are a CPU 31, a ROM 32, a RAM 33, and an EEPROM 34, and is connected to an ASIC (application-specific integrated circuit) 40 via a bus (not shown). The above-mentioned radio communication circuit 83 is connected to the control circuit 30.

The CPU 31 performs a facsimile operation (data communication) or a telephone operation by controlling the individual units according to various signals exchanged via the telephone line 185. The CPU 31 also controls operation of the entire multifunction machine 10.

The ROM 32 is a non-rewritable memory in which control programs to be executed in the multifunction machine 10 and other information are stored.

The RAM 33 is a memory for temporarily storing various kinds of data while the multifunction machine 10 performs each operation.

The EEPROM 34 stores flags, etc., that relate to operations of the multifunction machine 10.

Four buzzer circuits 41-44 each being capable of generating a monotone sound signal are provided in the ASIC 40. A monotone sound signal that is generated by each of the buzzer circuits 41-44 is output from the speaker 110 via the amplifier 100 as a monotone sound. Equipped with the four buzzer circuits 41-44, the multifunction machine 10 according to the embodiment can output a four-tone chord from the speaker 110. Further, a signal that is output from an on/off-hook detection sensor 150 is input to the ASIC 40. The recording sheet transport unit 80, the image recording unit 90, and the image reading unit 130 are connected to the ASIC 40, and operation of each of those units is controlled by the control circuit 30 and the ASIC 40. Although FIG. 2 is drawn as if the on/off-hook detection sensor 150 were provided inside the holder 120, as described later this is to express straightforwardly that the on/off-hook detection sensor 150 is activated when an engaging portion 121b of a plunger 121 is engaged with a an engaged portion 151 of an actuator 155. Actually, as described later, the on/off-hook detection sensor 150 itself is provided inside the machine casing 21.

Figure 3:
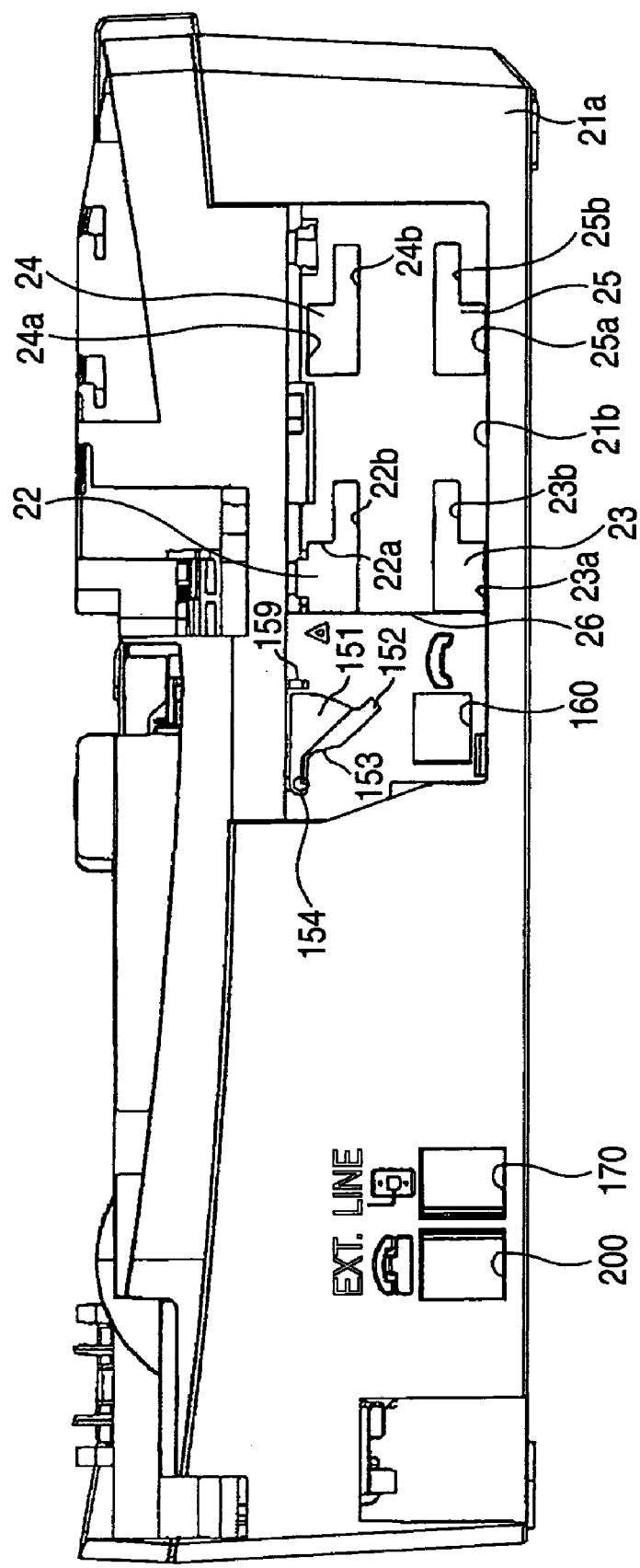
FIG. 3 is a side view of a machine casing as viewed from the side from which a holder is to be attached.

Next, a side wall 21a of the machine casing 21 to and from which the holder 120 can be attached and detached will be described with reference to FIG. 3. FIG. 3 is a side view of the machine casing 21 as viewed from the side from which the holder 120 is to be attached, and shows a state where the holder 120 is not attached to the machine casing 21.

The side wall 21a of the machine casing 21 to and from which the holder 120 can be attached and detached is provided with three connectors, that is, the connector 160 to which the main handset D is to be connected electrically, the connector 170 to which the telephone line 185 (described later) is to be connected electrically, and a connector 200 to which an external telephone set (not shown) is to be connected electrically. However, the connector 200 will not be described in detail because it is not directly related to the invention. The connector 200 is not shown in FIG. 2.

The side wall 21a of the machine casing 21 is formed with a recess 21b to which the holder 120 is to be attached. The recess 21b is formed with four openings 22-25 that allow the holder 120 to be attached in a detachable manner as well as an engagement wall 26 that is to engage an elastic engagement portion 126 of the holder 120 (described later). Four engagement projections 122-125 (described later) of an engagement block 120e of the holder 120 are to be engaged with the generally L-shaped openings 22-25, respectively. To this end, each of the openings 22-25 includes an insertion portion 22a, 23a, 24a, or 25a and a lock portion 22b, 23b, 24b, or 25b that communicates with the insertion portion 22a, 23a, 24a, or 25a and is narrower in the vertical direction than the insertion portion 22a, 23a, 24a, or 25a.

The engaged portion 151 and the actuator 155 of the on/off-hook detection sensor 150 are fixed to the same rotary shaft 154. The engaged portion 151 is exposed in the recess 21b so as to be rotatable by an angle in a prescribed range. Since the actuator 155 is normally urged downward by a spring (not shown), the engaged portion 151 is usually located at the position shown in FIG. 3. The engaged portion 151 can rotate upward about the rotary shaft 154. On the other hand, a limiting member 159 is disposed on the right side of the engaged portion 151. Therefore, the engaged portion 151 can rotate upward about the rotary shaft 154 until a contact portion 152 of the engaged portion 151 is brought into contact with the limiting member 159. The engaged portion 151 generally assumes a fan shape in a plan view, and its portion to be first engaged by the engaging portion 121b of the holder 120 is formed with a cutout portion 153a. When the engaging portion 121b engages the engaged portion 151 completely, the engaging portion 121b supports a vertical wall 153b slidably from below as shown in FIGS. 5 and 6.

Figure 5:
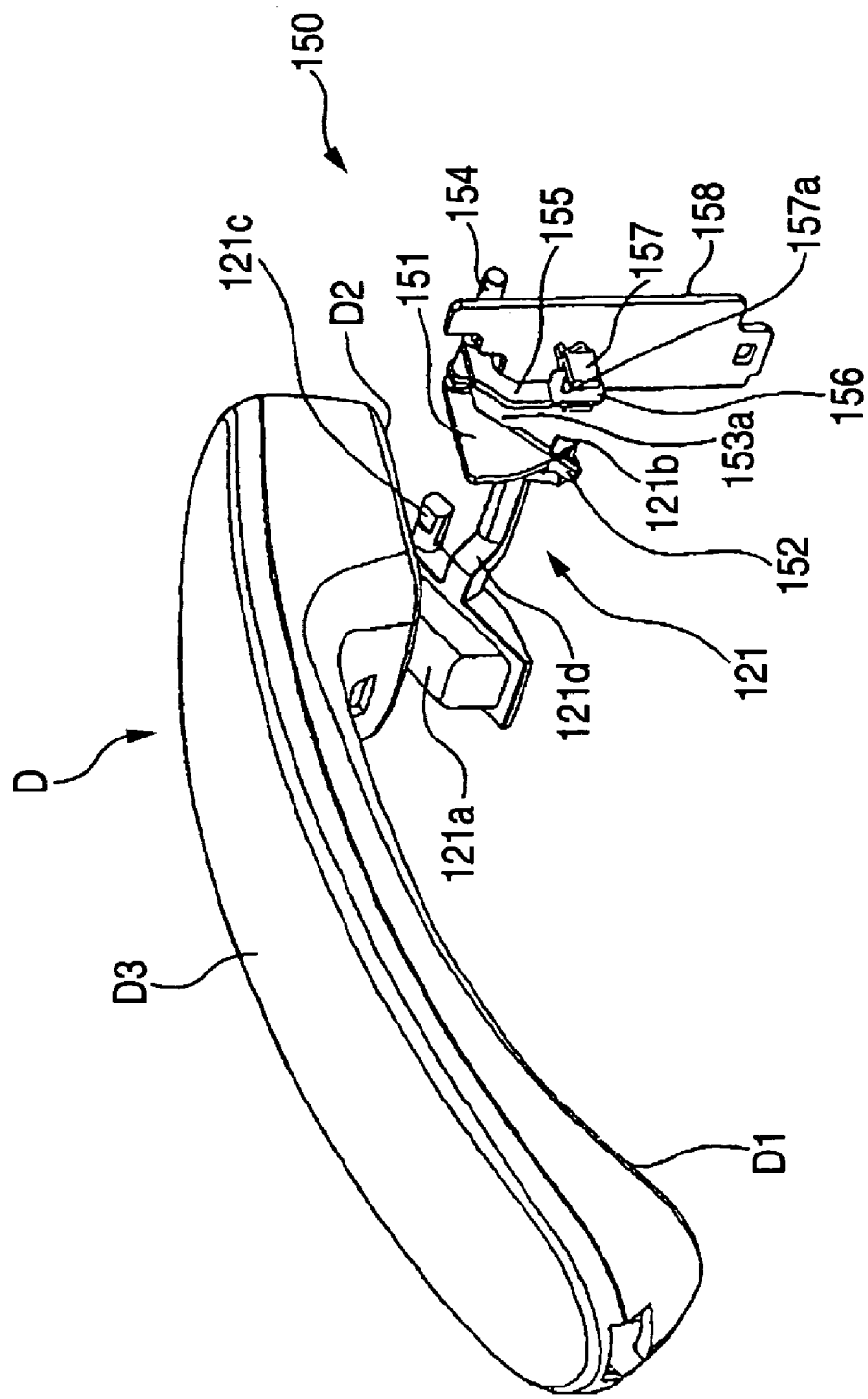
FIG. 5 is a perspective view showing an engagement relationship between a plunger and an on/off-hook detection sensor.
Figure 6:
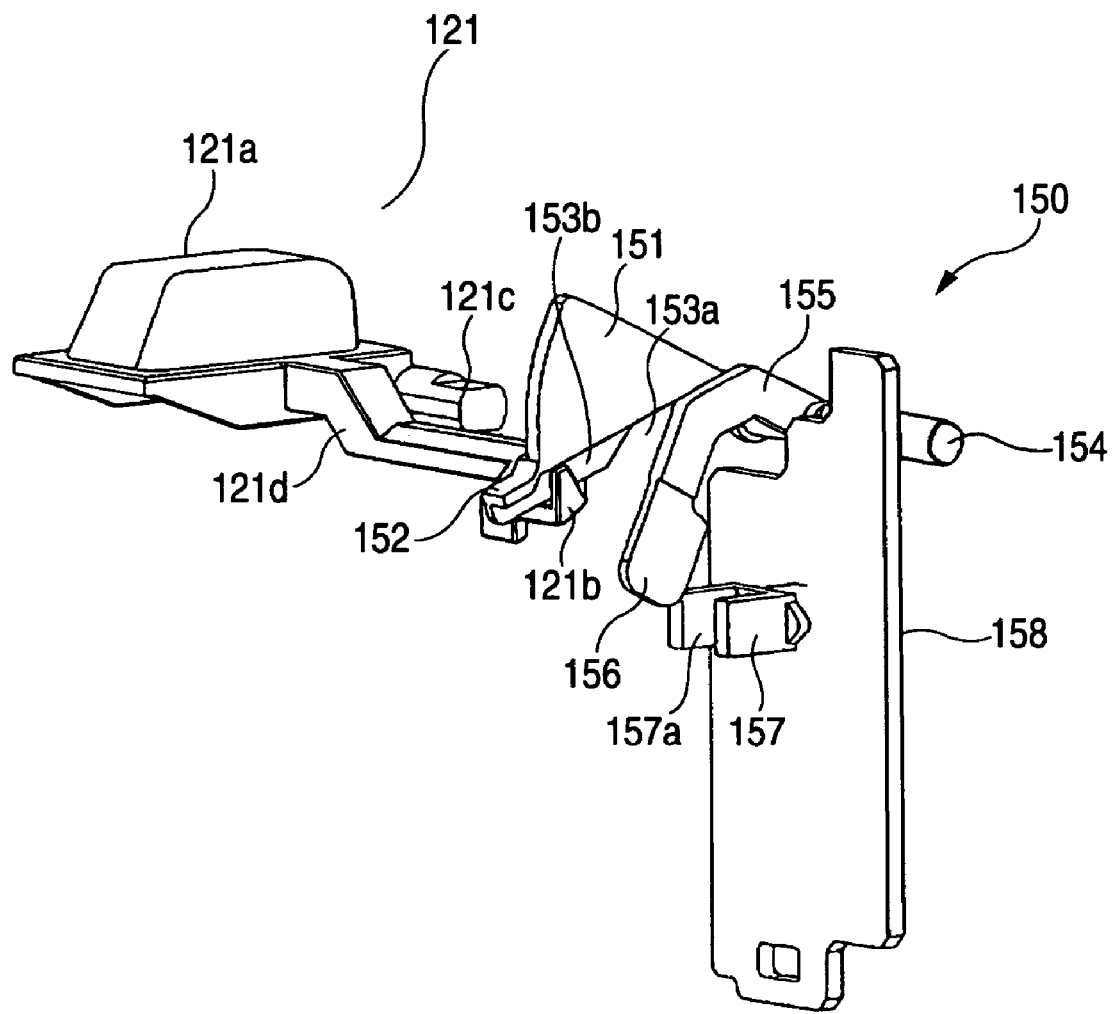
FIG. 6 is a perspective view showing another engagement relationship between the plunger and the on/off-hook detection sensor.

As shown in FIG. 5, the main handset D includes a transmitter unit D1 that incorporates a microphone for receiving a voice to transmit it to another telephone set or the like, a receiver unit D2 that incorporates a speaker for outputting a voice that is sent from another telephone set or the like, and a grip unit D3 as a portion of the main handset D to be gripped by the user with his or her hand. However, these units will not be described in detail because they are well known.

As shown in FIG. 4, the holder 120 is a resin molded part that is a combination of a top cover body 120A and a bottom cover body 120B and the plunger 121 is accommodated in its inside hollow space. As shown in FIGS. 5 and 6, the plunger 121 includes a head 121a, the engaging portion 121b, a rotary shaft 121c as a rotation axis of the plunger 121, and an arm 121d that connects the head 121a and the engaging portion 121b. The rotary shaft 121c is rotatably supported by a bearing (not shown) that is provided inside the holder 120. Therefore, when the head 121a is pushed by the receiver unit D2 of the main handset D, the plunger 121 is rotated about the rotary shaft 121a. The holder 120 has a placement surface on which the main handset D can be placed. The placement surface is formed with a first placement surface 120a on which the transmitter unit D1 is to be placed and a second placement surface 120b on which the receiver unit D2 is to be placed. The second placement surface 120b is formed with an opening 120c, and the head 121a of the plunger 121 can project and retract through the opening 120c. When the main handset D is placed on the holder 120 correctly, that is, when the transmitter unit D1 and the receiver unit D2 of the main handset D are placed on the first placement portion 120a and the second placement portion 120b, respectively, the head 121a of the plunger 121 is pushed down by the receiver unit D2 and hence retracts through the opening 120c. On the other hand, when the main handset D is lifted up from the holder 120, the head 121a of the plunger 121 projects upward through the opening 120c because the plunger 121 is normally urged by the spring (not shown) so that the head 121a thereof projects through the opening 120c.

Figure 7:
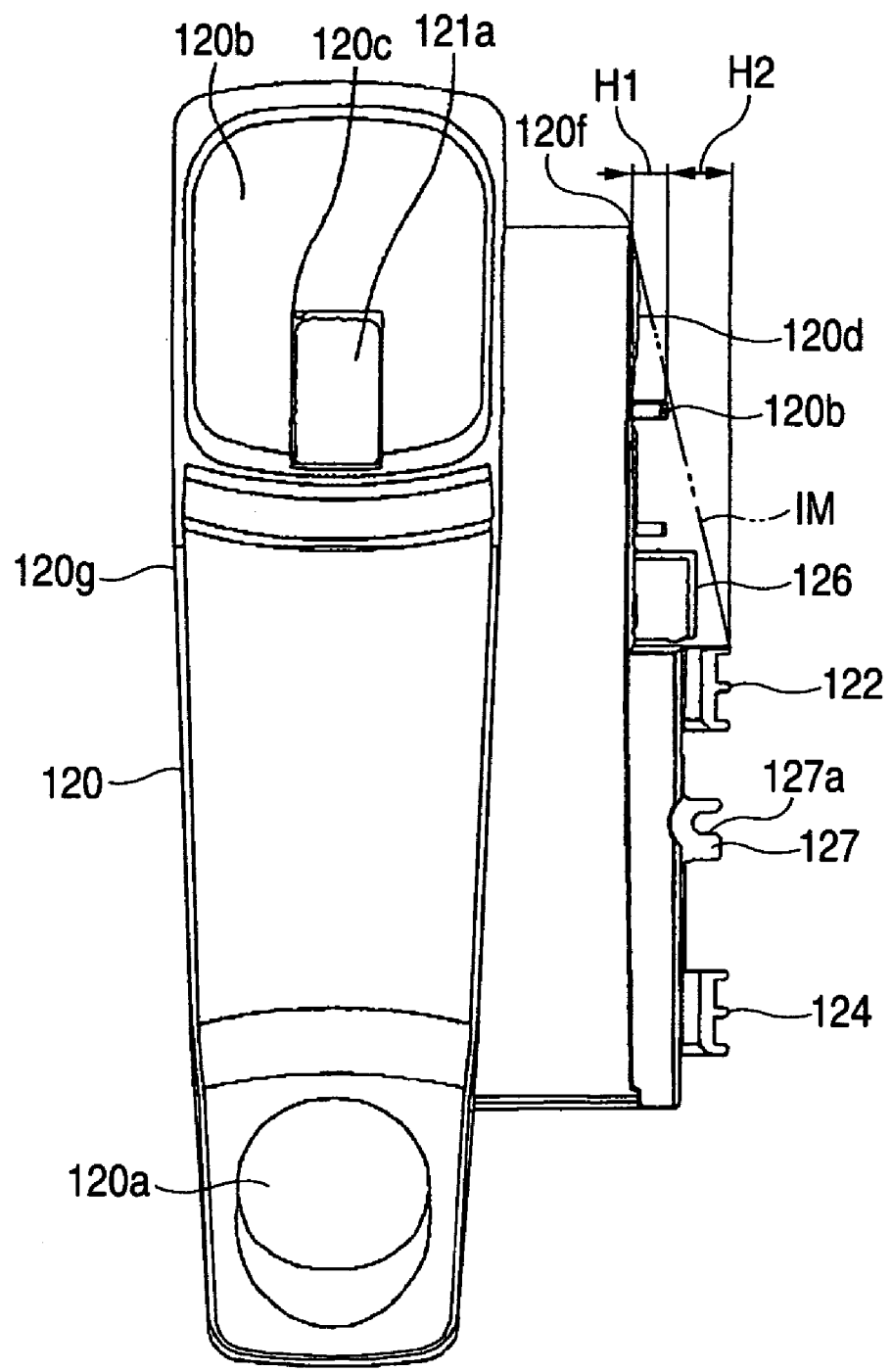
FIG. 7 is a plan view of the holder.

As shown in FIG. 7, the engaging portion 121b that is integral with the plunger 121 is slightly projected from an attachment surface (side surface 120d) of the holder 120 which is to be attached to the side wall 21a of the machine casing 21. The engaging portion 121b projects from the side surface 120d by a distance H1 (first distance: about 4.5 mm), and its tip is closer to the side surface 120d of the holder 120 than the tips of the four engagement projections 122-125 of the engagement block 120e are. Specifically, a distance H2 from the tip of the engaging portion 121b to the tips of the four engagement projections 122-125 is equal to 10.5 mm. That is, the four engagement projections 122-125 are projected from the side surface 120d by a distance (H1+H2) (second distance: about 15 mm). As a result, when the holder 120 is removed from the machine casing 21 and placed on the surface of a desk, for example, the four engagement projections 122-125 of the engagement block 12e come into contact with the surface. Since the engaging portion 121b does not directly contact the surface of the desk, for example, the risk that engaging portion 121b is damaged is very low.

Figure 4A:
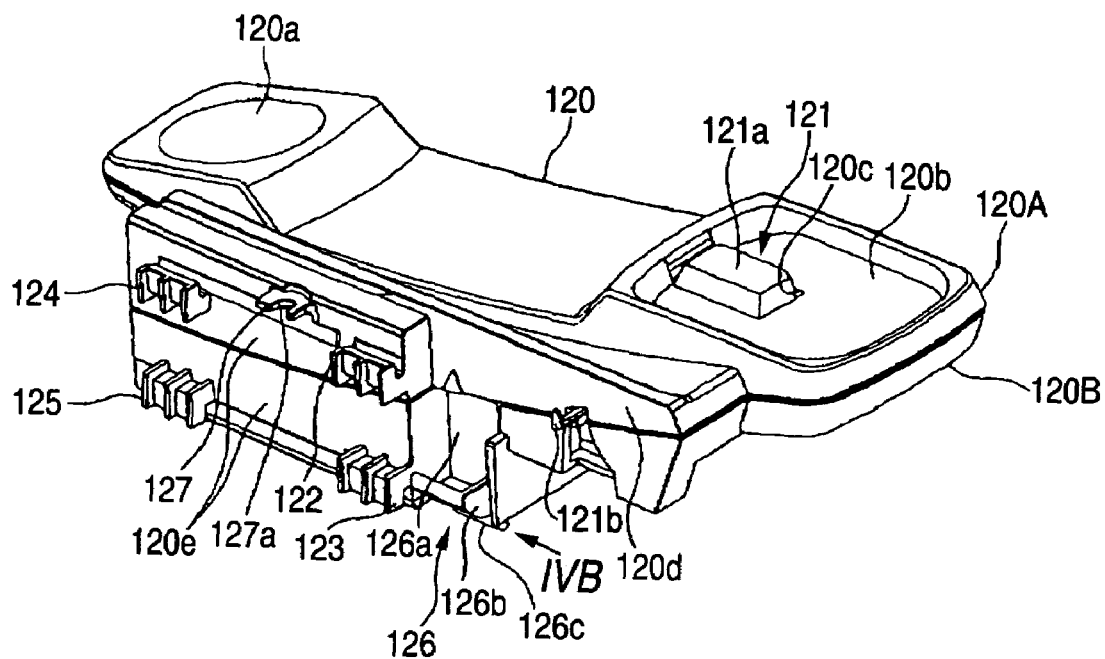
FIG. 4A is a perspective view of the holder and FIG. 4B is a side view of an elastic engagement portion as viewed in a direction shown by an arrow IVB in FIG. 4A.
Figure 4B:
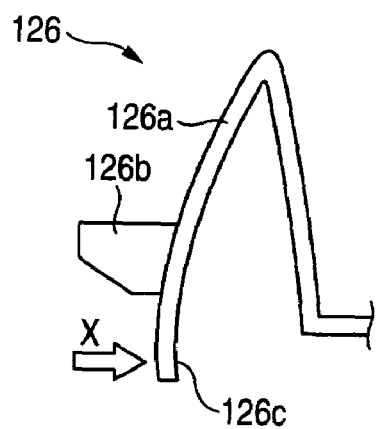

As shown in FIG. 4A, the elastic engagement portion 126 is disposed close to the side surface 120d of the holder 120. The elastic engagement portion 126 is integrally formed with the bottom cover body 120B and includes an elastic plate portion 126a, an engagement portion 126b, and a projection (manipulation portion) 126c as shown in FIG. 4B. The elastic plate portion 126a is a generally V-shaped thin-plate portion that is integral with the bottom cover body 120B and extends from it, and is capable of elastic deformation in a direction shown by an arrow X in FIG. 4B. The elastic plate portion 126a extends from the bottom cover body 120B so as to assume an inverted-V shape. One end portion of the elastic plate portion 126a extends from the bottom cover body 120B and the other end portion, that is, the tip portion, is integrally formed with the engagement portion 126b and the projection 126c. The engagement portion 126b is a portion to engage the engagement wall 26 and thereby prevent the holder 120 from coming off the machine casing 21 easily when the holder 120 is attached to the side wall 21a of the machine casing 21. The projection 126c is a thin-plate portion as a tip portion of the elastic engagement portion 126 and is a portion to be used in removing the holder 120 from the side wall 21a of the machine casing 21. That is, when the user pulls the projection 126c away from the machine casing 21 with his or her fingertip, the elastic plate portion 126a is deformed elastically and the engagement portion 126b is disengaged from the engagement wall 26, whereby the holder 120 can easily be removed from the machine casing 21.

The engagement block 120e is formed with a screw engagement portion 127 to be used for fixing the holder 120 to the machine casing 21 at a top position between the engagement projections 122 and 124. Formed with a recess 127a, the screw engagement portion 127 can be fixed to the machine casing 21 with a screw (not shown) after the holder 120 is attached to the machine casing 21. In this case, the screw is engaged with the recess 127a. When the holder 120 is attached to the machine casing 21, the engaging portion 121b engages the engaged portion 151. Since the engaging portion 121b is normally urged upward by the spring (not shown) for urging the plunger 121 and the engaged portion 151 is normally urged downward by the spring (not shown) for urging the actuator 155 downward, the engaging portion 121b is kept engaged with the engaged portion 151 as long as the holder 120 is attached to the machine casing 21. Therefore, the engaged portion 151 is rotated about the rotary shaft 154 as the plunger 121 operates.

Next, the structure of the on/off-hook detection sensor 150 will be described with reference to FIGS. 5 and 6. FIG. 5 shows only the main handset D in an on-hook state, the plunger 121, and the on/off-hook detection sensor 150. FIG. 6 shows only the plunger 121 in an off-hook state and the on/off-hook detection sensor 150.

The on/off-hook detection sensor 150 includes the engaged portion 151, the rotary shaft 154, the actuator 155, an optical sensor 157, and a circuit board 158. The engaged portion 151 will not be described in detail because it has already been described above. Like the engaged portion 151, one end portion of the actuator 155 is fixed to the rotary shaft 154. Therefore, the actuator 155 is rotated as the engaged portion 151 and the rotary shaft 154 are rotated. The actuator 155 is formed with a light interrupting portion 156 at its tip. The optical sensor 157 has a generally U-shaped groove portion 157a, and two walls of the groove portion 157a are provided with a light-emitting element and a light-receiving element, respectively. As the actuator 155 is rotated, the light interrupting portion 156 located at its tip enters or retreats from the groove portion 157a. As shown in FIG. 5, when the light interrupting portion 156 is inserted in the groove portion 157a, that is, when an on-hook state (described later) is established, light emitted from the light-emitting element is interrupted by the light interrupting portion 156 and is not received by the light-receiving element. On the other hand, as shown in FIG. 6, when the light interrupting portion 156 is retreated from the groove portion 157a, that is, when an off-hook state (described later) is established, light emitted from the light-emitting element is not interrupted by the light interrupting portion 156 and hence is received by the light-receiving element as it is.

When the holder 120 is not attached to the machine casing 21, the engaged portion 151 is located at the position shown in FIG. 3 because as described above the actuator 155 is urged downward by the spring (not shown). Therefore, the light interrupting portion 156 of the actuator 155 is inserted in the groove portion 157a as in the case of FIG. 5, and hence the light-receiving element cannot receive light emitted from the light-emitting element. Therefore, the multifunction machine 10 recognizes that the same state as a state where the main handset D is correctly placed on the holder 120 (what is called an on-hook state) is established.

On the other hand, when the main handset D is not placed on the holder 120 (what is called an off-hook state) though the holder 120 is attached to the machine casing 21, the engaged portion 151 is rotated until the contact portion 152 is brought into contact with the above-mentioned limiting member 159 because the urging force of the spring (not shown) for urging the plunger 121 upward is stronger than that of the spring (not shown) for urging the actuator 155 downward. Therefore, the engaged portion 151 is located at the position shown in FIG. 6. In this state, since the light interrupting portion 156 of the actuator 155 is retreated from the groove portion 157a, the light-receiving element receives light emitted from the light-emitting element as it is. Therefore, the multifunction machine 10 recognizes that a state where the main handset D is not placed on the holder 120 (what is called an off-hook state) is established.

When the holder 120 is attached to the machine casing 21 and a state where the main handset D is correctly placed on the holder 120 is established (what is called an on-hook state), the head 121a of the plunger 121 is pushed by the receiver unit D2 of the main handset D and hence is located at the position shown in FIG. 5. In this state, the light interrupting portion 156 of the actuator 155 is inserted in the groove portion 157a and hence the light-receiving element cannot receive light emitted from the light-emitting element. Therefore, the multifunction machine 10 recognizes that a state where the main handset D is correctly placed on the holder 120 (what is called an on-hook state) is established.

Next, a method for attaching the holder 120 to the machine casing 21 will be described with reference to FIGS. 3 and 4. First, a user grips the holder 120 with his or her hand so that the four engagement projections 122-125 of the holder 120 are opposed to the insertion portions 22a-25a of the four generally L-shaped openings 22-25, respectively, and inserts the engagement projections 122-125 into the insertion portions 22a-25a. At this time point, the engaging portion 121b is not in contact with the engaged portion 151. Then, the user moves the four engagement projections 122-125 to the lock portions 22b-25b of the openings 22-25, respectively, by sliding the holder 120 toward the front side of the machine casing 21 (i.e., the side where the operating panel 140 is disposed) while gripping the holder 120. As a result, the engagement projections 122-125 which project so as to generally assume an L-shape are locked so as to hold the wall portions over or under the lock portions 22b-25b, whereby the holder 120 is attached to the machine casing 21. As the holder 120 is slid, the engaging portion 121b is first inserted into the cutout portion 153a of the engaged portion 151 which is close to the rotary shaft 154 and then engages the engaged portion 151. When the holder 120 is attached to the machine casing 21, the engagement portion 126b of the elastic engagement portion 126 of the holder 120 is engaged with the engagement wall 26 of the recess 21b, whereby the holder 120 is made less prone to come off the machine casing 21.

Figure 8:
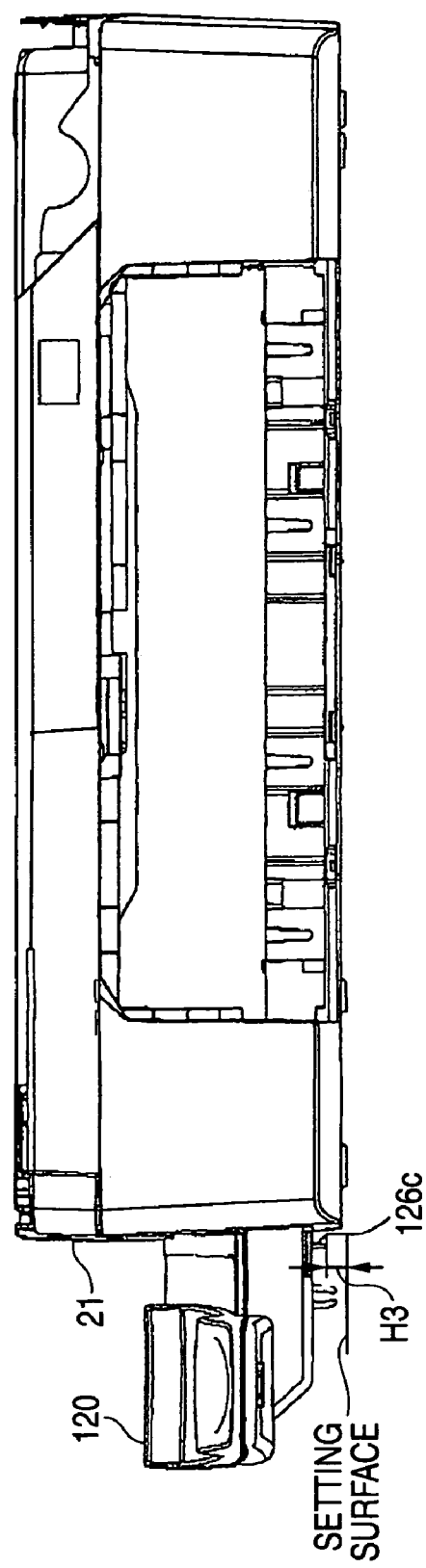
FIG. 8 is a front view of the machine casing to which the holder is attached.

When the holder 120 is attached to the machine casing 21, as shown in FIG. 8, a distance H3 between the tip of the projection 126c and a setting surface on which the multifunction machine 10 is placed is approximately equal to 5 mm. Therefore, when the multifunction machine 10 is used in a state where it is placed on the setting surface of a desk or a stage (i.e., in an ordinary use state), the user cannot insert his or her finger into the gap between the tip of the projection 126c and the setting surface and hence cannot manipulate the projection 126c. To manipulate the projection 126c, the user needs to lift up the multifunction machine 10 away from the desk or stage. As described above, it is difficult to remove the holder 120 from the machine casing 21 unless the user manipulates the projection 126c. Therefore, the probability that the user removes the holder 120 from the machine casing 21 erroneously is very low.

As described above in detail, in the holder 120 according to the embodiment, the second distance (H1+H2) by which the engagement projections 122-125 project from the side surface 120D is longer than the first distance H1 by which the engaging portion 121b projects from the side surface 120D. When the user positions the holder 120 to engage the engagement projections 122-125 with respect to the machine casing 21, the engaging portion 121b of the holder 120 is properly positioned so as to correspond to the on/off-hook detection sensor 150 disposed on the side of the communication apparatus. Therefore, the attachment operation of the holder 120 with respect to the machine casing 21 is facilitated.

Also, since the second distance H2 is longer than the first distance H1, even if the holder 120 is left detached from the casing, the probability that the arm 121d and the engaging portion 121b are damaged is very low.

In addition, the side surface 120d extends substantially perpendicularly to a direction in which the second placement surface 120b extends. Therefore, the attachment operation of the holder 120 with respect to the machine casing 21 is facilitated.

Also, as shown in FIG. 7, the holder 120 has a corner portion 120f, the engaging portion 121b is located between the corner portion 120f and the engagement projection 122, and the engaging portion 121b does not project from an imaginary line IM that connects a tip end of the engagement projection 122 and the corner portion 120f. Thus, the probability that the engaging portion 121b and the arm 121d are damaged is very low.

Further, the holder 120 is provided with the engagement block 120e that is fittable to the recess 21b provided on the machine casing 21, and the engagement projections 122-125 that are projected from the engagement block 120e and are engagable to openings 22-25 formed in the recess 21b. Therefore, the holder 120 can be firmly attached to the machine casing 21.

Additionally, since plural engagement projections 122-125 are provided, the holder 120 can be firmly attached to the machine casing 21.

Also, the engagement block 120e has a block surface formed in a substantially rectangular shape, and the plural engagement projections 122-125 are arranged in the vicinity of four corners of the block surface. Therefore, the holder 120 can be smoothly slid on the machine casing 21 during the attachment and detachment operation.

Further, the holder 120 is provided with the elastic engagement portion 126 that elastically engages with the engagement wall 26 of the machine casing 21 when the holder 120 is attached to the machine casing 21 to prevent the holder 120 from coming off the machine casing 21, and the projection 126c that releases the engagement between the machine casing 21 and the elastic engagement portion 126. The projection 126c is located closer to the side surface 120d than to a second side surface 120g of the holder 120 (see FIG. 7), which is opposed to the side surface 120d. Thus, the risk that the user touches the projection 126c unintentionally is very low.

In addition, the projection 126c projects from a bottom surface of the holder 120 which is opposed to the first and second placement surfaces 120a, 120b, as shown in FIG. 8. Therefore, when the user intends to remove the holder 129 from the machine casing 21, the user can easily access to the projection 126c by lifting up the multifunction machine 10.

Also, the elastic engagement portion 126 projects substantially in the same direction as the engaging portion 121b from the side surface 120d. Thus, the attachment operation of the holder 120 with respect to the machine casing 21 is facilitated.

Further, the elastic engagement portion 126 and the projection 126c are located between the engagement projection 122 and the engaging portion 121b. Therefore, the attachment operation of the holder 120 with respect to the machine casing 21 is facilitated.

In addition, the third distance H3 between a setting surface on which the multifunction machine 10 is placed and the projection 126c can be set to be 20 mm or less. In this manner, the insertion of the user's finger into the gap therebetween is prevented.

Also, the projection 126c is remote from the second side surface 120g toward the side surface 120d of the holder by 30 mm or more, preferably, approximately 65 mm. In this way, the risk that the user touches the projection 126c unintentionally is further reduced.

Further, the on/off-hook detection sensor 150 has the engaged portion 151 that is moved by the engaging portion 121b. When the holder 120 is attached to the machine casing 21 while being slid on the machine casing 21, the engaged portion 151 is positioned between the engagement projection 122 and the engaging portion 121b and the engaged portion 151 is moved by the engaging portion 121b. Thus, the attachment operation of the holder 120 with respect to the machine casing 21 is facilitated.

The invention is not limited to the above-described embodiment and various modifications are possible without departing from the spirit and scope of the invention.

For example, although in the above embodiment the on/off-hook detection sensor 150 employs the optical sensor having the light-emitting element and the light-receiving element, a sensor that mechanically detects a movement of the actuator or a contact sensor that detects contact/non-contact of the actuator may be used.

Although in the above embodiment the holder 120 is slid in the horizontal direction when it is attached to the machine casing 21, the holder 120 may be caused to make a vertical slide movement or a slide movement as a combination of horizontal and vertical movements. In short, any structure may be employed as long as it allows the engaging portion 121b of the holder 120 to engage the engaged portion 151 of the machine casing 21 when the holder 120 is attached to the machine casing 21.

If the user wants to leave the holder 120 detached from the machine casing 21 because of a narrow installation space, a dedicated cover for covering the recess 21b may be prepared to hide the openings 22-25, the connector 160, and the engaged portion 151 and improve the appearance or prevent entrance of foreign matter. The cover maybe distributed to users by packing it together with the multifunction machine 10 or sold separately.

What is claimed is:

1. A holder that is detachably attachable to a casing of a communication apparatus, comprising:
    a placement surface on which a handset can be placed;
    a first side surface;
    a displacement unit that is displaced in response to an act of placing the handset on the placement surface;
    a lever that is displaced according to a displacement of the displacement unit, the lever being projected in a first direction by a first distance from the first side surface; and
    an engagement portion being projected substantially in the first direction by a second distance, which is longer than the first distance, from the first side surface, the engagement portion engaging the holder with the casing.

2. The holder according to claim 1, wherein the first side surface extends substantially perpendicularly to a direction in which the placement surface extends.

3. The holder according to claim 1, further comprising a corner portion;
    wherein the lever is located between the corner portion and the engagement portion; and
    the lever does not project from an imaginary line that connects a tip end of the engagement portion and the corner portion.

4. The holder according to claim 1, wherein the engagement portion comprises:
    a block that is fittable to a recess provided on the casing; and
    an arm portion that is projected from the block and is engagable to an opening formed in a bottom surface of the recess.

5. The holder according to claim 4, wherein the arm portion comprises a plurality of arm portions.

6. The holder according to claim 5, wherein the block has a block surface formed in a substantially rectangular shape; and
    the plurality of arm portions are arranged in the vicinity of four corners of the block surface.

7. The holder according to claim 1, further comprising:
    an elastic engagement portion that elastically engages a portion of the casing, when the holder is attached to the casing, to prevent the holder from coming off the casing; and
    a manipulation portion that releases the engagement between the casing and the elastic engagement portion;
    wherein the manipulation portion is located closer to the first side surface than to a second side surface of the holder which is opposed to the first side surface.

8. The holder according to claim 7, wherein the manipulation portion projects from a bottom surface of the holder which is opposed to the placement surface.

9. The holder according to claim 8, wherein the elastic engagement portion projects substantially in the first direction from the first side surface.

10. The holder according to claim 7, wherein the elastic engagement portion and the manipulation portion are located between the engagement portion and the lever.

11. A communication apparatus comprising:
    a casing;
    a handset;
    a holder that is detachably attachable to the casing and comprises:
        a placement surface on which the handset can be placed;
        a first side surface;
        a displacement unit that is displaced in response to an act of placing the handset on the placement surface;
        a lever that is displaced according to a displacement of the displacement unit, the lever being projected in a first direction by a first distance from the first side surface; and
        an engagement portion being projected substantially in the first direction by a second distance, which is longer than the first distance, from the first side surface, the engagement portion engaging the holder with the casing; and
    a detection unit that detects in cooperation with the lever whether or not the handset is placed on the placement surface.

12. The communication apparatus according to claim 11, wherein the first side surface extends substantially perpendicularly to a direction in which the placement surface extends.

13. The communication apparatus according to claim 11, wherein the holder further comprises a corner portion;
    the lever is located between the corner portion and the engagement portion; and
    the lever does not project from an imaginary line that connects a tip end of the engagement portion and the corner portion.

14. The communication apparatus according to claim 11, wherein the casing has a recess on a bottom surface of which an opening is formed; and
    the engagement portion comprises a block that is fittable to the recess and an arm portion that is projected from the block and is engagable to the opening.

15. The communication apparatus according to claim 14, wherein the opening has a plurality of openings; and
    the arm portion comprises a plurality of arm portions.

16. The communication apparatus according to claim 15, wherein the block has a block surface formed in a substantially rectangular shape; and
    the plurality of arm portions are arranged in the vicinity of four corners of the block surface.

17. The communication apparatus according to claim 11, wherein the casing comprises an engagement wall;
    the holder comprises:
        an elastic engagement portion that elastically engages the engagement wall, when the holder is attached to the casing, to prevent the holder from coming off the casing; and
        a manipulation portion that releases the engagement between the casing and the elastic engagement portion; and the manipulation portion is located closer to the first side surface than to a second side surface of the holder which is opposed to the first side surface.

18. The communication apparatus according to claim 17, wherein the manipulation portion projects from a bottom surface of the holder which is opposed to the placement surface.

19. The communication apparatus according to claim 18, wherein the elastic engagement portion projects substantially in the first direction from the first side surface.

20. The communication apparatus according to claim 17, wherein the elastic engagement portion and the manipulation portion are located between the engagement portion and the lever.

21. The communication apparatus according to claim 18, wherein a third distance between a setting surface on which the communication apparatus is placed and the manipulation portion is 20 mm or less.

22. The communication apparatus according to claim 18, wherein the manipulation portion is remote from the second side surface toward the first side surface of the holder by 30 mm or more.

23. The communication apparatus according to claim 11, wherein the detection unit comprises a moved portion that is moved by the lever; and when the holder is attached to the casing while being slid on the casing, the moved portion positioned between the engagement portion and the lever is moved by the lever.

* * * * *